United States Patent
Zeid et al.

(10) Patent No.: US 7,862,056 B2
(45) Date of Patent: Jan. 4, 2011

(54) STEERING GEAR INERTIA DAMPER

(75) Inventors: Ashraf Zeid, Dearborn, MI (US);
Frederick R. Kasten, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1007 days.

(21) Appl. No.: 11/701,728

(22) Filed: Feb. 2, 2007

(65) Prior Publication Data

US 2008/0185248 A1   Aug. 7, 2008

(51) Int. Cl.
B62D 7/22  (2006.01)

(52) U.S. Cl. .................. 280/89; 464/180; 188/380

(58) Field of Classification Search .......... 188/379, 188/380; 267/285; 464/180; 280/89, 779; 74/574.4; 180/381
See application file for complete search history.

(56) References Cited

U.S. PATENT DOCUMENTS

| | | | |
|---|---|---|---|
| 4,935,651 A * | 6/1990 | Hong et al. .............. 310/51 |
| 5,272,933 A * | 12/1993 | Collier et al. ............ 74/498 |
| 5,315,888 A * | 5/1994 | Amberntson ............. 74/5.5 |
| 5,468,055 A * | 11/1995 | Simon et al. ............ 301/6.91 |
| 5,503,043 A * | 4/1996 | Olbrich ................. 74/574.4 |
| 5,542,343 A | 8/1996 | Martin | |
| 5,699,462 A | 12/1997 | Fouquet et al. | |
| 6,135,224 A | 10/2000 | Thomas | |
| 6,195,478 B1 | 2/2001 | Fouquet et al. | |
| 6,320,994 B1 | 11/2001 | Donald et al. | |
| 6,324,316 B1 | 11/2001 | Fouquet et al. | |
| 6,487,333 B2 | 11/2002 | Fouquet et al. | |
| 6,491,313 B1 | 12/2002 | Rui et al. | |
| 6,547,043 B2 * | 4/2003 | Card .................. 188/267.2 |
| 6,561,305 B2 | 5/2003 | Smith et al. | |
| 6,623,365 B1 * | 9/2003 | Maretzke et al. ........... 464/180 |
| 6,637,558 B2 * | 10/2003 | Oliver et al. ............ 188/267.2 |
| 6,681,883 B2 | 1/2004 | Loh | |
| 6,752,425 B2 * | 6/2004 | Loh et al. ............... 280/779 |
| 7,031,564 B2 | 4/2006 | Sims | |
| 7,172,269 B2 | 2/2007 | Sims | |
| 2004/0071595 A1 | 4/2004 | Neeper et al. | |
| 2004/0124846 A1 | 7/2004 | Yamashita et al. | |
| 2005/0121896 A1 | 6/2005 | Bonhard et al. | |

\* cited by examiner

*Primary Examiner*—Paul N Dickson
*Assistant Examiner*—Timothy D Wilhelm
(74) *Attorney, Agent, or Firm*—Paul K. Godwin, Jr.

(57) ABSTRACT

A tunable mass damper for use in a vehicle steering system in which a rack and pinion gearing subsystem would otherwise transfer resonant vibrations to the vehicle steering wheel. The mass damper element is a generally cylindrical mass supported and suspended around the shaft extending from the pinion gear by several cantilevered spring elements. The mass damper is tunable by modifying the size of the mass or the size or material or length of the springs so that the damper's resonant frequency for axial oscillation matches the resonant vibrations present at the steering shaft extending from the pinion gear.

4 Claims, 2 Drawing Sheets

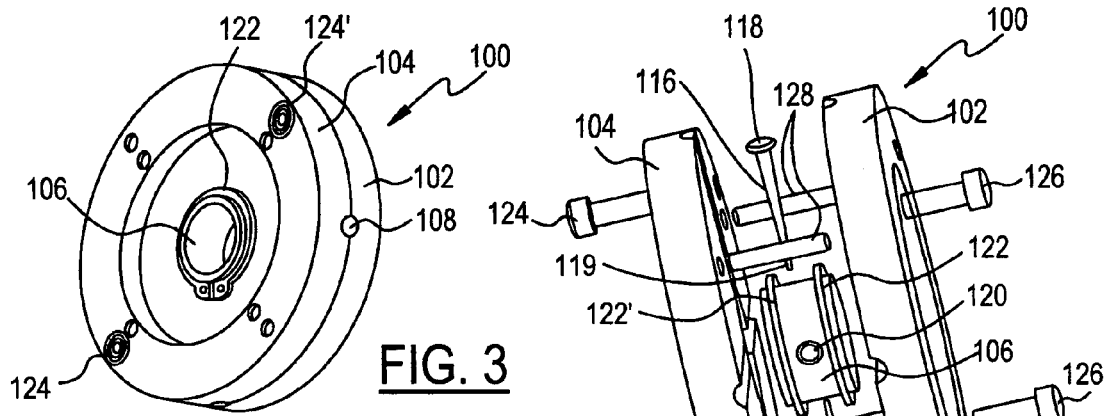
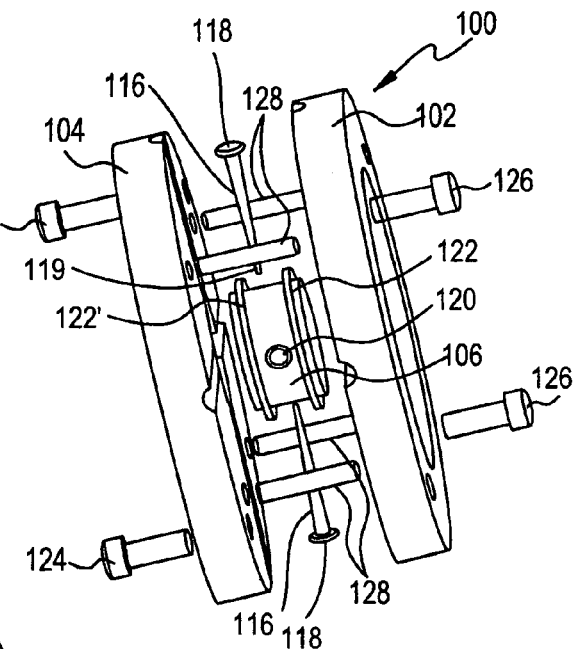
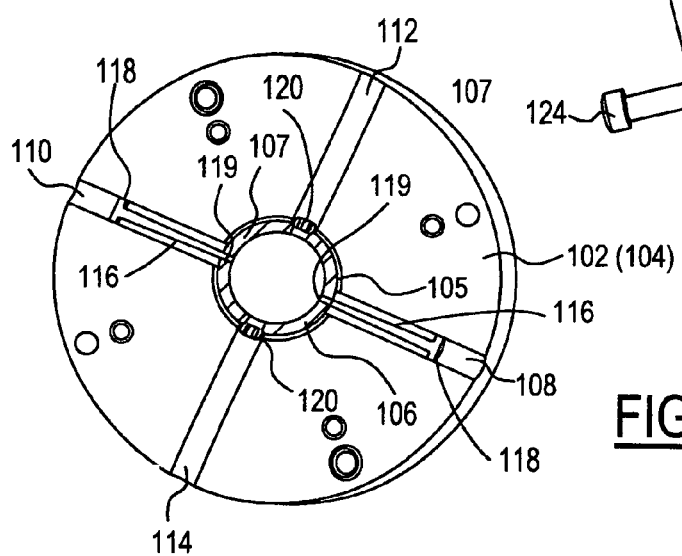
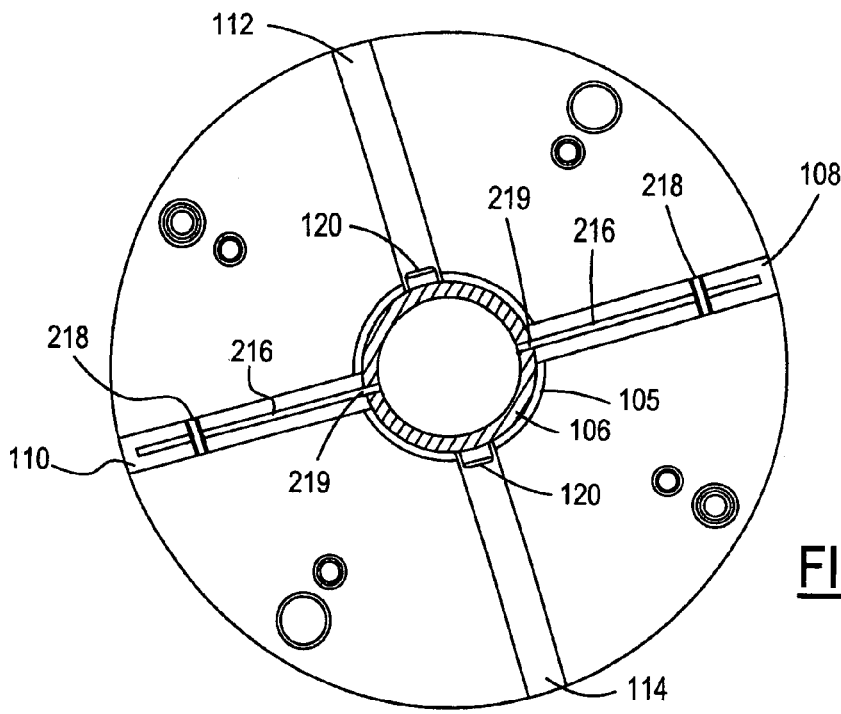

STEERING GEAR INERTIA DAMPER

BACKGROUND OF THE INVENTION

The invention relates generally to the field of vibration isolation in steering gear of automotive vehicles and more particularly to the area of minimizing the effects of road and wheel nibble vibration feedback through the steering system to the vehicle operator.

DESCRIPTION OF THE PRIOR ART

Automotive vehicle steering systems are subject to a large number of forces that may cause vibrations at a wide spectrum of frequencies which are felt by the driver through the steering wheel. One of these undesirable steering wheel vibrations, commonly known as "nibble", may be caused by brake roughness, tire/wheel imbalance, road input, or other excitations. Due to cost and complexity management, some vehicle manufacturers prefer absorbing nibble at the steering gear system level.

Since steering nibble is caused by excitations over a wide range of different frequencies that range between 15 and 30 Hz, an effective engineering solution to the problem is very challenging. Previous efforts to eliminate nibble have focused on designing and tuning the elastomeric bushings, bearings, and joints used throughout the steering and suspension systems to achieve a desired level of vibration damping. Unfortunately, these efforts, because they rely on adding frictional damping, have had only limited success. The reason of the limited success is that adding damping compromises other vehicle steering attributes especially returnability. Moreover, electronically controlled damping and hydraulic damping require electronic control units, sensors, or a large number of hydraulic parts that add cost to the steering system.

Oil-filled elastomeric bushings, also known as hydraulic bushings, are the primary type of bearing used to reduce suspension vibration caused by brake and tire/wheel systems. However, hydraulic bushings require a relatively large amount of packaging space, so that major structural and chassis system redesigns may be required to accommodate these components. Also, hydraulic bushings are expensive and not very durable and introduce friction in the steering gear.

U.S. Pat. No. 6,561,305 describes a mechanism that applies a torsional damping force to a steering shaft or column that connects a steering wheel to a steering assembly (such as a rack and pinion assembly). This torsional damping also directly inhibits rotation of the steering wheel by adding friction to the system and therefore may have an undesirable effect on steering feel.

Published patent application US2005/012896 describes a vibration absorber which utilizes two energy absorbing units mounted in radial spokes of a steering wheel and an alternative embodiment in which energy absorbing units are mounted within the steering wheel itself. If not properly designed and assembled, the location of free moving masses directly in the steering wheel may induce undesirable noise or vehicle handling harshness especially when located too close to the driver's hand.

U.S. Pat. No. 6,491,313 describes a variable hydraulic damper intended for attachment to a rack or center link of a steering system. The amount of damping provided by the device is varied by controlling the size of an orifice through which fluid flows between the opposite sides of a piston. The size of the orifice is varied in inverse proportion to the amount of hydraulic pressure being supplied to the power assisted steering system. This results in greater damping being applied to the steering system when a relatively low degree of power assist is called for (such as at higher vehicle speed and/or neutral steering wheel angle positions), and less damping being applied when a higher degree of power assist is called for (such as at lower vehicle speed and/or greater steering wheel angle displacement). This device overcomes the limitations inherent in torsional dampers pointed out in the paragraph above, but a hydraulic damper has its own inherent limitations in regards to the specific types of vibrations that it can effectively damp. Furthermore, this damper requires an electronic control unit and pressure sensors for its implementation.

SUMMARY OF INVENTION

The present invention utilizes the principle of employing a sprung inertia to create and apply an opposing force to a vibrating component to counteract and thereby inhibit or significantly reduce the vibration of the component whenever it occurs.

In automotive steering systems which encounter nibble resonance vibration at certain speeds, the present invention acts to minimize such rotational vibration, since it is tuned to the same resonant frequency and provides counteracting feedback to the input shaft without adding friction to the steering system.

The present invention provides an effective means for reducing steering nibble and other vibrations encountered in a vehicle steering system without changing or compromising any other performance attributes of a vehicle's steering or suspension systems. In general, this is achieved by providing a rotary tunable vibration isolator that counteracts the vibrational effects otherwise introduced to the steering input shaft without adding friction to the system.

The vibration isolator includes a single rotating mass that is mounted on a portion of the steering input shaft. The mass is mounted to the shaft by a plurality of thin cantilever beams that act as spring elements and allow the surrounding mass to move rotationally and oscillate co-axially with respect to the shaft. The number, diameter, composition and length of the spring elements that attach the mass to the input shaft can be selected to provide tuning to the input resonance frequency (nibble frequency) that is desired to be suppressed.

It is an object of the present invention to provide a steering system for a wheeled vehicle that includes a rack gear movable along an axis to control the steering angle of at least one wheel, a pinion gear in mesh with the pinion gear to deliver steering force to the rack gear to change the steering angle and a steering shaft axially extending from the pinion gear. An inertial damping member is provided which is attached to the steering shaft and reactively operates to apply a torsional damping force in opposition to torsional vibrations occurring between the rack gear and the pinion gear that would otherwise cause the steering shaft to be oscillated about its axis and conveyed to the associated steering wheel.

It is another object of the present invention to provide a torsional mass damper for a steering system wherein the damping member comprises a pair of cylindrical disks configured to be mated together and when so mated define a mass member. Each disk contains a central opening that is larger that the diameter of the steering shaft to which it is associated and a plurality of radial passages sized to capture and attach the mass member to the heads of spring elements when the disks are mated together. The spring elements provide support for the mass member in a manner whereby the mass member is spaced from the steering shaft at the central opening and the mass member is allowed to oscillate without otherwise touching the steering shaft.

It is a further object of the present invention to provide an isolation damper for a vehicle steering system in which a cylindrical mass element is attached to a steering shaft and freely suspended by spring elements, out of direct contact with said steering shaft.

BRIEF DESCRIPTION OF THE DRAWINGS

FIG. 3 is a perspective view of an embodiment of the torsional damper employed in the present invention.

FIG. 4 is an exploded view of a first embodiment of the torsional damper employed in the present invention.

FIG. 5 is a plan view of the inner portion of a first embodiment of the torsional damper employed in the present invention.

FIG. 6 is a plan view of the inner portion of a second embodiment of the torsional damper employed in the present invention.

DETAILED DESCRIPTION OF THE INVENTION

Figure 1:
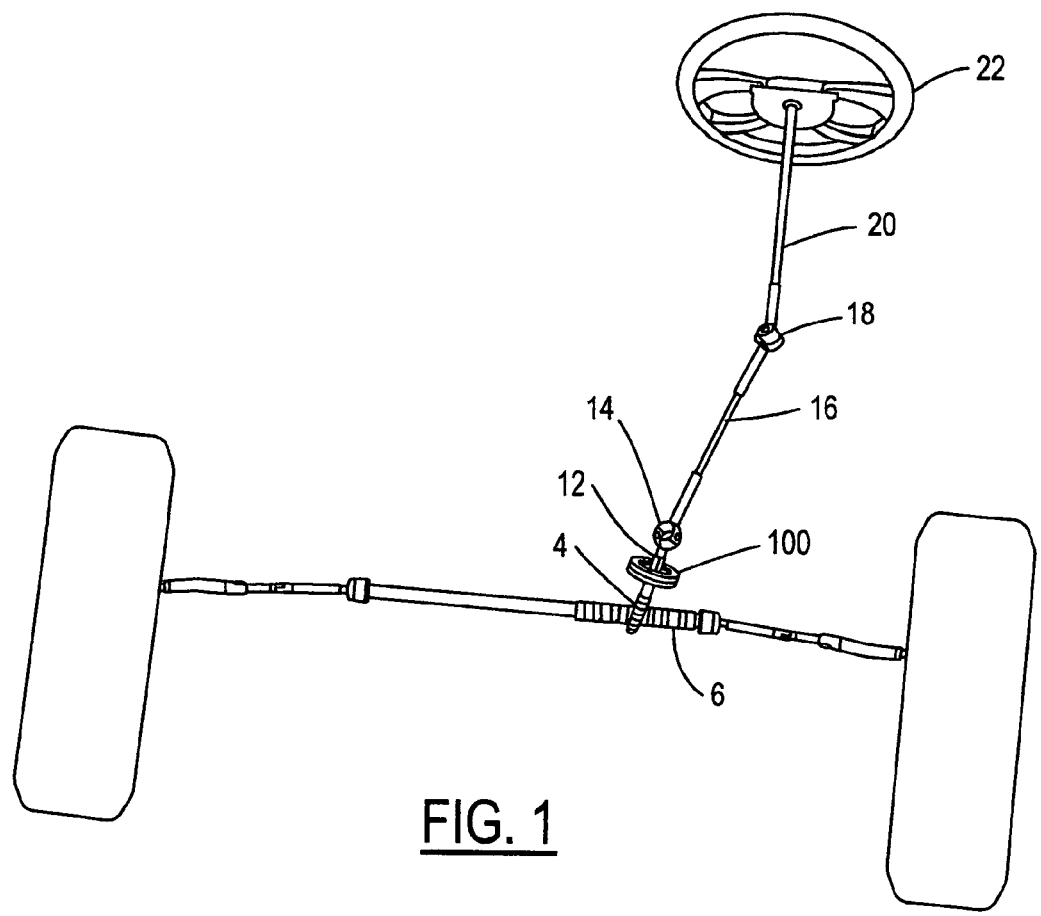
FIG. 1 is a simplified view of a typical steering system for an automotive vehicle incorporating the present invention.

FIG. 1 represents the location of the present invention in a typical vehicle steering system. The represented steering system includes a rack gear 6 that is connected to elements of the system which translate longitudinal movement of rack gear 6 into steering angles of a pair of wheels. Rack gear 6 is directly meshed with a rotating pinion steering gear 8. Steering gear 8 extends axially from an input steering shaft 12. Input steering shaft 12 is connected to a coupling 14, which in turn is connected to an intermediate shaft 16. Intermediate shaft 16 is also connected to a coupling 18 which is connected to a steering shaft 20. In this representation, steering shaft 20 is connected to a steering wheel 22. (Note: Although most modern vehicle steering systems involve a power assist subsystem that may include a hydraulically or electrically driven power steering motor, the inclusion of such power assistance is not necessary for the understanding of the present invention and is not shown.)

When steering nibble occurs, it is normally felt at steering wheel 22 by the operator. It is a small angular motion that can be measured at the input shaft and is due to small longitudinal forces acting on the rack gear 6. These forces are transmitted through the pinion steering gear 8, input shaft 12, coupling 14, intermediate shaft 16, coupling 18, steering shaft 20 and steering wheel 22. The rack longitudinal displacement is usually on the order of 0.1 mm and the forces are on the order of approximately 100 Newton in the 10-15 HZ frequency range at resonance.

Figure 2:
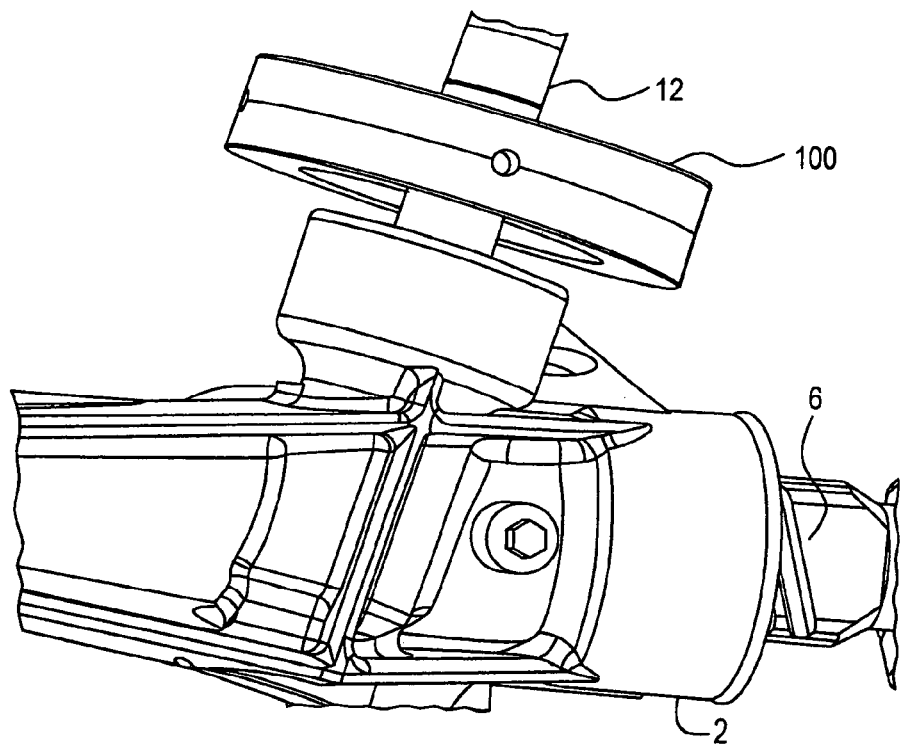
FIG. 2 is an enlargement of an embodiment of the present invention incorporated in the steering system represented in FIG. 1.

The present invention reduces the effects of nibbling by utilizing a tuned torsional damping mass 100. The damping mass 100 is shown in FIGS. 1 and 2 being mounted on input steering shaft 12 so as to have an immediate inhibiting effect on the nibble vibration close to its source. As the nibble vibration occurs at the predetermined resonance frequency, the input shaft is caused to oscillate in a torsional manner about its axis. Torsional damping mass 100, which is tuned to the same frequency, responds to the movement of input shaft 12 and enters its resonant mode. Torsional damping mass 100 then rotationally oscillates about the axis of input shaft 12 in opposing directions to those of input shaft 12. By oscillating out of phase and opposite to the drive shaft 12, torsional mass damper 100 applies opposing forces that cancel those applied to input shaft 12 by rack gear 6.

FIGS. 3, 4 and 5 serve to illustrate the components that comprise torsional damping mass 100. In a first embodiment, a first cylindrical disk 102 and a second cylindrical disk 104 are shown clamped together by several fasteners 124 and 126 and additionally held in alignment by pins 128. Disks 102 and 104 substantially constitute the "mass" portion of torsional damping mass 100. In this embodiment, the disks are constructed of a steel alloy. However, in other similar applications, the material chosen for disk fabrication may be any material that exhibits properties of reproducible mass distribution, cost efficiency, and long life.

Disks 102 and 104 have a center opening 105 with a diameter that is slightly larger than a bushing 106 that is loosely fitted therein and held in place by a set of snap rings 122 and 122'. Bushing 106 is sized to fit tightly onto input shaft 12. However, set screws 120 are provided and located in bushing 106 to secure tightening of bushing 106 to shaft 12.

Cantilever spring beam elements 116 each have a small end 119 which is press fitted into apertures 107 (107') on opposite sides of the bushing. Spring beam elements 116 also each have a relatively large head portion 118 at the other end which is in direct contact with the first and second cylindrical disks 102 and 104. Radial passages 110 and 108 are sized to capture and secure heads 118 in place when the disks are mated. Also, radial passages 110 and 108 are sized to accommodate limited movement of the mated disks about spring beam elements 116 during the torsional resonant oscillations.

Cantilever spring beam elements 16 are pre-selected in material, length, cross-section and bending properties so as to provide resonant vibration with the selected mass and opposing forces at a sufficient magnitude to counteract those present in steering shaft 12. This provides the flexibility to use the same mass elements, with different spring elements for various vehicle suspensions with various vibrational frequency characteristics.

It can be seen from the foregoing description that one advantage of the present invention is that the mass damping employed does not interfere with the steering mechanism. And because it is rotationally suspended on the steering shaft, it does not add any friction component to the system.

A second embodiment of the present invention is represented in FIG. 6. The second embodiment differs from the first embodiment described above in its selection of spring elements 216. In this embodiment, the cantilever springs 216 each have a first end that is fitted into a corresponding aperture on the bushing 106. Each spring has a head 218 that is in contact with the wall of a passage 110. In this embodiment, the head is adjustable prior to assembly of the disks 102 and 104. The spring may be constructed with matching threads on the head 218 and shaft portion, or head 218 may slidably mounted on the shaft portion. In any event, when the two disks 102 and 104 are fastened together, the heads are permanently held in their predetermined locations. This further allows one to set the tuning of the damping mass as is required to overcome nibble effects on various vehicles.

We claim:

1. A steering system for a wheeled vehicle comprising:
a rack gear movable along an axis to control the steering angle of at least one wheel;
a pinion gear in mesh with said rack gear to deliver steering force to said rack gear to change the steering angle;
a steering shaft axially extending from said pinion gear;
a torsional damping member attached to said steering shaft operative to apply a torsional damping force in opposition to torsional vibrations occurring between said rack gear and said pinion gear that would otherwise cause said shaft to be torsionaly oscillated about its axis, wherein said damping member includes a cylindrical mass element that encircles said steering shaft and is supported on said steering shaft by a plurality of spring elements, wherein said cylindrical mass element is freely suspended by said spring elements and out of direct contact with said steering shaft, wherein each of said spring elements has a first end that is fixedly attached to said steering shaft and a second end that is remote from said first end; and a head element located near the second end of each spring element to provide a spring attachment to said cylindrical mass element, said spring elements being cantilevered with respect to their attachment to said steering shaft, wherein said mass element is supported by said head elements on said spring elements, wherein each said head element is repositionable to preselected positions on said spring element to allow said damping member to be tunable.

2. A torsional mass damper for use in a steering system comprising:

a rack gear;

a pinion gear extending from a steering shaft and meshed with said rack gear; and a mass damper including a mass member attached to said steering shaft reactively operative to apply a damping force in opposition to vibrations occurring between said rack gear and said pinion gear that would otherwise cause said steering shaft to be oscillated about its axis, said mass member comprising a cylindrical mass solid element that encircles said steering shaft and is supported on said steering shaft by a plurality of cantilevered spring elements, each of said spring elements having a first end that is fixedly attached to said steering shaft and a second end that is remote from said first end, and said spring elements including a head element located near the second end of each spring element to provide a spring attachment to said cylindrical mass element, wherein each said head element is repositionable to preselected positions on said spring element to allow said damping member to be tunable.

3. A steering system for a wheeled vehicle comprising:

a rack gear movable along an axis to control the steering angle of at least one wheel;

a pinion gear in mesh with said rack gear to deliver steering force to said rack gear to change the steering angle;

a steering shaft axially extending from said pinion gear; and a torsional damping member attached to said steering shaft operative to apply a torsional damping force in opposition to torsional vibrations occurring between said rack gear and said pinion gear that would otherwise cause said shaft to be torsionaly oscillated about its axis, wherein said damping member comprises a cylindrical mass element that encircles said steering shaft and is supported on said steering shaft by a plurality of spring elements, each of said spring elements having a first end that is fixedly attached to said steering shaft and a second end that is remote from said first end, wherein said spring elements include a head element located near the second end of each spring element to provide a spring attachment to said cylindrical mass element, wherein said torsional damping member has a resonant frequency at which said mass element oscillates axially about a central axis, and wherein each said head element is repositionable to preselected positions on said spring element to select the resonant frequency of said damping member.

4. A torsional mass damper for use in a steering system comprising:

a rack gear;

a pinion gear extending from a steering shaft and meshed with said rack gear; and a mass damper including a mass member attached to said steering shaft reactively operative to apply a damping force in opposition to vibrations occurring between said rack gear and said pinion gear that would otherwise cause said steering shaft to be oscillated about its axis, wherein said mass member includes a cylindrical mass solid element that encircles said steering shaft and is supported on said steering shaft by a plurality of cantilevered spring elements, each of said spring elements having a first end that is fixedly attached to said steering shaft and a second end that is remote from said first end, said spring elements including a head element located near the second end of each spring element to provide a spring attachment to said cylindrical mass element, wherein said damping member has a resonant frequency at which said mass member oscillates axially about a central axis, wherein each said head element is repositionable to preselected positions on said spring element to select the resonant frequency of said damping member.

* * * * *